United States Patent
Yu et al.

(10) Patent No.: US 9,514,395 B2
(45) Date of Patent: Dec. 6, 2016

(54) METHOD AND APPARATUS FOR GENERATING OR USING INTERACTION ACTIVITY INFORMATION

(71) Applicant: Samsung Electronics Co., Ltd., Gyeonggi-do (KR)

(72) Inventors: Seung dong Yu, Gyeonggi-do (KR); Woo-yong Chang, Gyeonggi-do (KR); Se-jun Park, Gyeonggi-do (KR); Min-jeong Moon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 69 days.

(21) Appl. No.: 13/785,948

(22) Filed: Mar. 5, 2013

(65) Prior Publication Data

US 2013/0185647 A1 Jul. 18, 2013

Related U.S. Application Data

(63) Continuation of application No. 12/861,484, filed on Aug. 23, 2010, now Pat. No. 8,612,636.

(30) Foreign Application Priority Data

Aug. 21, 2009 (KR) .................. 10-2009-0077871
Aug. 19, 2010 (KR) .................. 10-2010-0080064

(51) Int. Cl.
*G06F 3/00* (2006.01)
*G06K 15/00* (2006.01)
(Continued)

(52) U.S. Cl.
CPC ......... *G06K 15/4045* (2013.01); *G06F 3/0484* (2013.01); *G06F 3/1232* (2013.01);
(Continued)

(58) Field of Classification Search
CPC .................................. G06F 3/00; G06F 13/00
(Continued)

(56) References Cited

U.S. PATENT DOCUMENTS 6,704,401 B2 3/2004 Piepho et al.
6,744,870 B1 6/2004 Lehtinen
(Continued)

FOREIGN PATENT DOCUMENTS

CN 1595875 3/2005
CN 1735061 2/2006
(Continued)

OTHER PUBLICATIONS

Russian Office Action dated Mar. 20, 2013 issued in a counterpart application, namely Appln. No. 2012105985.
(Continued)

*Primary Examiner* — Christopher Shin
(74) *Attorney, Agent, or Firm* — The Farrell Law Firm, P.C.

(57) ABSTRACT

A method of generating interaction activity information, performed by a device, is provided. The method includes establishing communication with at least one external apparatus; receiving first information about a user selectable function of the external apparatus; and generating second information, based on the first information, about a user selectable function of the device, wherein the user selectable function of the device corresponds to the user selectable function of the external device and can be performed in collaboration with the external device.

6 Claims, 11 Drawing Sheets

(51) Int. Cl.
*H04L 12/28* (2006.01)
*G06F 3/0484* (2013.01)
*H04L 29/08* (2006.01)
*H04L 29/06* (2006.01)
*G06F 3/12* (2006.01)
*G06F 13/00* (2006.01)

(52) U.S. Cl.
CPC .......... *G06F 3/1236* (2013.01); *G06F 3/1292* (2013.01); *H04L 12/282* (2013.01); *H04L 12/2814* (2013.01); *H04L 67/04* (2013.01); *H04L 67/16* (2013.01); *H04L 69/18* (2013.01)

(58) Field of Classification Search
USPC .............................. 710/8, 104, 105; 709/227
See application file for complete search history.

(56) References Cited

U.S. PATENT DOCUMENTS

| | | | |
|---|---|---|---|
| 7,027,881 B2 | 4/2006 | Yumoto et al. | |
| 7,076,210 B2 | 7/2006 | Sasai et al. | |
| 7,184,707 B2 | 2/2007 | Tada et al. | |
| 7,469,277 B2 | 12/2008 | Hirata et al. | |
| 7,474,430 B2 | 1/2009 | Onuma et al. | |
| 7,617,008 B2 | 11/2009 | Ashida | |
| 7,643,851 B2 | 1/2010 | Otsuka et al. | |
| 7,792,932 B2 | 9/2010 | Doi et al. | |
| 7,796,979 B2 | 9/2010 | Adams et al. | |
| 7,917,862 B2 | 3/2011 | Breidenbach et al. | |
| 7,941,786 B2 | 5/2011 | Scott et al. | |
| 7,975,242 B2 | 7/2011 | Forstall et al. | |
| 7,996,496 B2 | 8/2011 | Haartsen et al. | |
| 8,009,642 B2 | 8/2011 | Palm | |
| 8,036,194 B2 | 10/2011 | Matsumura | |
| 8,045,552 B2 | 10/2011 | Unger | |
| 8,060,627 B2 * | 11/2011 | Rosenblatt .............. G06F 15/16 709/228 | |
| 8,060,659 B2 | 11/2011 | Ichieda | |
| 8,078,787 B2 | 12/2011 | Lydon et al. | |
| 8,266,658 B2 | 9/2012 | Funabiki et al. | |
| 8,516,125 B2 * | 8/2013 | Rosenblatt ........ G06F 17/30058 707/812 | |
| 8,588,692 B2 | 11/2013 | Takei et al. | |
| 8,788,567 B2 | 7/2014 | Sakai et al. | |
| 2003/0080874 A1 | 5/2003 | Yumoto et al. | |
| 2004/0264916 A1 | 12/2004 | Van De Sluis et al. | |
| 2005/0053017 A1 | 3/2005 | Komiya et al. | |
| 2006/0034259 A1 | 2/2006 | Matsuda | |
| 2007/0002840 A1 | 1/2007 | Song et al. | |
| 2007/0013801 A1 | 1/2007 | Sezan et al. | |
| 2007/0197236 A1 | 8/2007 | Ahn et al. | |
| 2007/0200916 A1 | 8/2007 | Han | |
| 2007/0294381 A1 | 12/2007 | Hong et al. | |
| 2008/0233983 A1 | 9/2008 | Park et al. | |
| 2008/0246736 A1 | 10/2008 | Han | |
| 2009/0138897 A1 | 5/2009 | Onogi et al. | |
| 2009/0157753 A1 | 6/2009 | Lee et al. | |
| 2009/0254980 A1 | 10/2009 | Kanaparti | |
| 2010/0050214 A1 | 2/2010 | Funabiki et al. | |
| 2010/0082567 A1 * | 4/2010 | Rosenblatt ........ G06F 17/30017 707/705 | |
| 2010/0082784 A1 * | 4/2010 | Rosenblatt .......... H04L 12/2812 709/222 | |
| 2011/0021269 A1 * | 1/2011 | Wolff-Peterson et al. ..... 463/29 | |
| 2014/0057560 A1 * | 2/2014 | Lin ..................... H04M 1/7253 455/41.1 | |
| 2016/0171353 A1 | 6/2016 | Yu et al. | |

FOREIGN PATENT DOCUMENTS

| | | |
|---|---|---|
| CN | 101286913 | 10/2008 |
| CN | 101442526 | 5/2009 |
| EP | 1 383 278 | 1/2004 |
| EP | 2 000 919 | 12/2008 |
| JP | 2000-330883 | 11/2000 |
| JP | 2003-046657 | 2/2003 |
| JP | 2005-010917 | 1/2005 |
| JP | 2005-524253 | 8/2005 |
| JP | 2005-267146 | 9/2005 |
| JP | 2009-146390 | 7/2009 |
| JP | 2011-044148 | 3/2011 |
| KR | 100643978 | 11/2006 |
| KR | 102006013387 | 12/2006 |
| KR | 1020070047626 | 5/2007 |
| KR | 1020080005840 | 1/2008 |
| KR | 1020080024582 | 3/2008 |
| KR | 1020080091598 | 10/2008 |
| KR | 1020090049650 | 5/2009 |
| KR | 1020090065355 | 6/2009 |
| RU | 2 182 349 | 5/2002 |
| WO | WO 02/33496 | 4/2002 |
| WO | WO 2006/082861 | 8/2006 |
| WO | WO 2008/072763 | 6/2008 |
| WO | WO 2008/103103 | 8/2008 |

OTHER PUBLICATIONS

Australian Office Action dated May 7, 2013 issued in a counterpart application, namely Appln. No. 20100284780.
Chinese Office Action dated Jun. 5, 2015 issued in a counterpart application No. 201010261305.X, 17 pages.
Japanese Office Action dated Feb. 23, 2015 issued in a counterpart application No. 2010-186289.
Korean Office Action dated Dec. 28, 2015 issued in counterpart application No. 10-2010-0080064, 9 pages.
Chinese Office Action dated Feb. 1, 2016 issued in counterpart application No. 201010261305.X, 16 pages.
Japanse Office Action dated May 30, 2016 issued in counterpart application No. 2015-126058, 12 pages.

* cited by examiner

FIG. 8
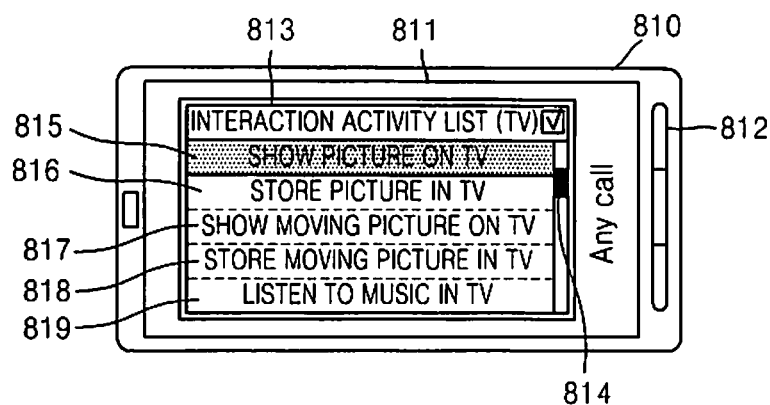
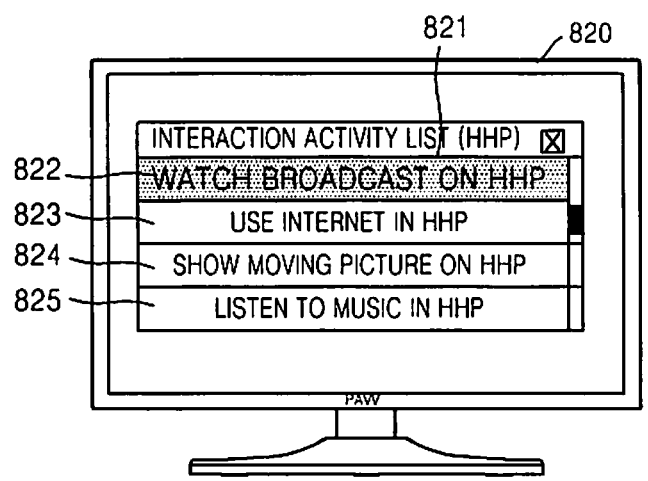

FIG. 10
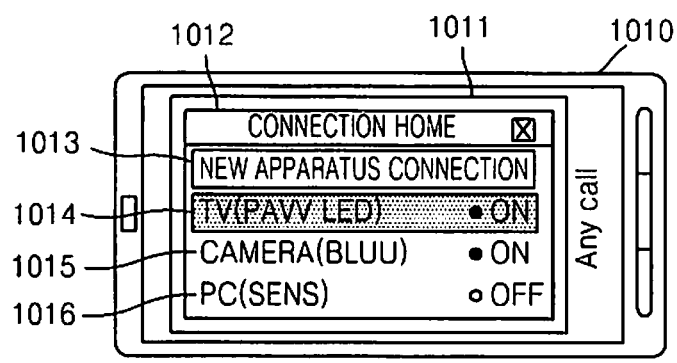
(a)
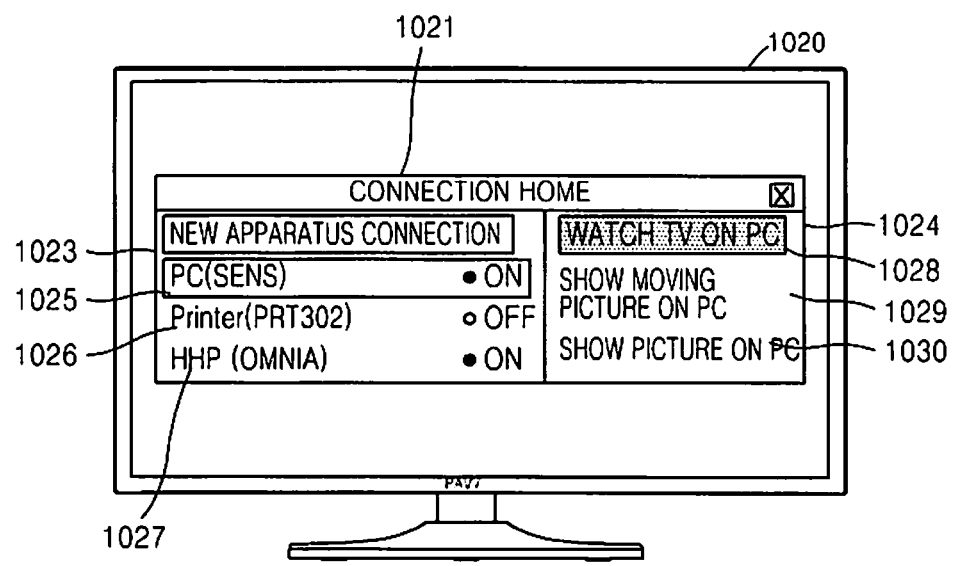
(b)

METHOD AND APPARATUS FOR GENERATING OR USING INTERACTION ACTIVITY INFORMATION

PRIORITY

This is a Continuation of U.S. application Ser. No. 12/861,484, filed on Aug. 23, 2010, which application claims priority to Korean Patent Application No. 10-2009-0077871, filed on Aug. 21, 2009, and Korean Patent Application No. 10-2010-0080064, filed on Aug. 19, 2010, in the Korean Intellectual Property Office, the entire content of each of which is incorporated herein by reference.

BACKGROUND OF THE INVENTION

1. Field of the Invention

The present invention generally relates to methods and apparatuses for generating or using interaction activity information, and more particularly, to methods and apparatuses for generating or using interaction activity information about a function that is used interactively between connected apparatuses.

2. Description of the Related Art

Recently, for user convenience, there has been a need for consumer electric (CE) products that interact with each other during their operations. Currently, by virtue of the development of network and electronic technologies, there have been many CE products that interact with each other during their operations.

SUMMARY OF THE INVENTION

An aspect of the present invention is to address at least the problems and/or disadvantages and to provide at least the advantages described below. Aspects of the present invention provide methods and apparatuses for generating or using interaction activity information.

According to an aspect of the present invention, a method of generating interaction activity information, performed by a device, is provided. The method includes establishing communication with at least one external apparatus; receiving first information about a user selectable function of the external apparatus; and generating second information, based on the first information, about a user selectable function of the device, wherein the user selectable function of the device corresponds to the user selectable function of the external device and can be performed in collaboration with the external device.

According to another aspect of the present invention, a method of displaying a cooperative function list, performed by a device, is provided. The method includes establishing communication with at least one external apparatus; receiving information about at least one user selectable function of the external apparatus; and displaying a list, based on the information, of at least one user selectable function of the device, wherein the at least one user selectable function of the device can be performed in collaboration with the external device.

According to another aspect of the present invention, a method, performed by a device, of carrying out a cooperative function with an external device is provided. The method includes establishing communication with the external device; transmitting information about at least one function of the device; receiving control signal from the external device; and carrying out the cooperative function in collaboration with the external device in response to the control signal, wherein the cooperative function is a user selectable function provided in the device and can be performed in collaboration with the external device.

BRIEF DESCRIPTION OF THE DRAWINGS

The above and other features and advantages of the present invention will become more apparent by describing in detail embodiments thereof with reference to the attached drawings in which:

FIGS. 8A and 8B are diagrams explaining interaction activity lists, according to an embodiment of the present invention;

FIG. 10A is a diagram explaining a list of found external apparatuses, which is displayed on the connection requesting apparatus, according to an embodiment of the present invention;

FIG. 10B is a diagram explaining a list of found external apparatuses, which is displayed on the connection requesting apparatus, according to another embodiment of the present invention;

DETAILED DESCRIPTION OF EMBODIMENTS OF THE INVENTION

The term "interaction activity information" as used herein refers to information about a function that may be used interactively between connected apparatuses. For example, according to such an interaction function, when a first apparatus and a second apparatus are connected to each other, a function of the first apparatus may be performed by the second apparatus, or a function of the second apparatus may be performed by the first apparatus. An interaction activity list is one embodiment of the interaction activity information. Hereinafter, information about the interaction function will be referred to as an interaction activity list.

Figure 1:
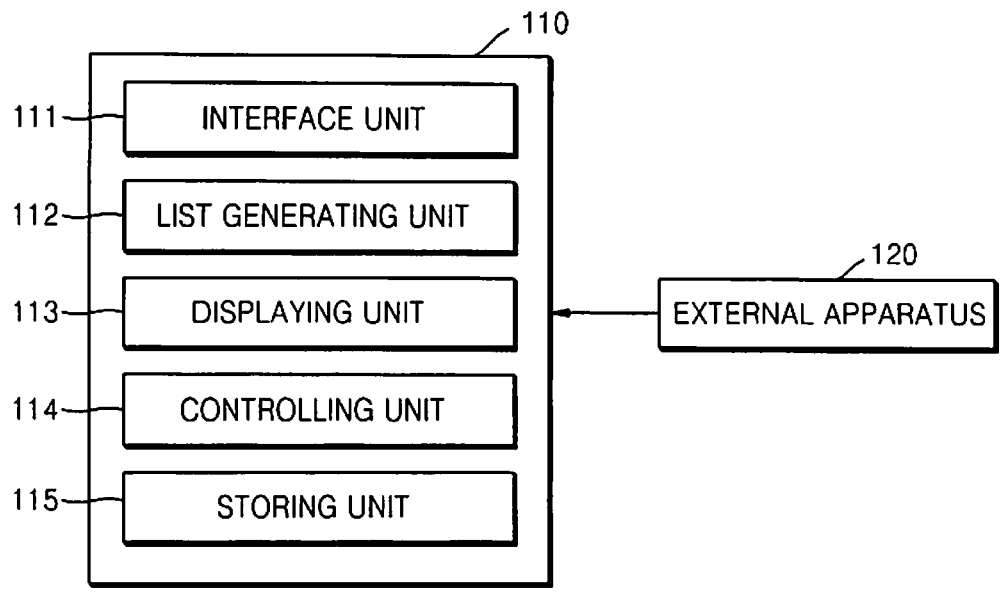
FIG. 1 is a block diagram of an interaction activity list generating apparatus according to an embodiment of the present invention.

FIG. 1 is a block diagram of an interaction activity list generating apparatus 110 according to an embodiment of the present invention.

Referring to FIG. 1, the interaction activity list generating apparatus 110 includes an interface unit 111, a list generating unit 112, a displaying unit 113, a controlling unit 114, and a storing unit 115.

The interaction activity list generating apparatus 110 is connected to an external apparatus 120 via the interface unit 111. A connecting method between the interaction activity list generating apparatus 110 and the external apparatus 120 will be described in detail below. The interface unit 111 receives information about a function that is capable of being performed in the external apparatus 120 from the external apparatus 120. The information about a function that is capable of being performed in the external apparatus 120 includes metadata regarding functions, performances and limitations of the external apparatus 120. The metadata includes the functions, performances and limitations of the external apparatus 120, but is not limited thereto. The metadata may include any information as long as the information can be used to generate the interaction activity list. In addition, the information about a function that is capable of being performed in the external apparatus 120 may further include controlling signals regarding functions and performances of the external apparatus 120. If interaction activity list generating apparatus 110 receives the information about a function that is capable of being performed in the external apparatus 120 after requesting the external apparatus 120 for the information about a function that is capable of being performed in the external apparatus 120, the information about a function that is capable of being performed in the external apparatus 120 may further include authorization information with respect to the controlling signals of the external apparatus 120. The interface unit 111 transmits the metadata of the external apparatus 120 to the list generating unit 112.

The list generating unit 112 generates the interaction activity list using the metadata of the external apparatus 120, which is received from the interface unit 111. In detail, the list generating unit 112 selects functions of apparatuses including the interaction activity list generating apparatus 110, which may be performed by the external apparatus 120, with reference to the functions, performances and limitations of the external apparatus 120, which are included in the metadata. Then, the list generating unit 112 generates the interaction activity list using the selected functions, and controlling signals corresponding to the selected functions from among the received controlling signals. The generated interaction activity list is stored in the storing unit 115.

The controlling unit 114 selects one external apparatus 120, from among external apparatuses that are searched for via the interface unit 111, generates a connection request signal, and transmits the connection request signal to the interface unit 111. The interface unit 111 transmits the connection request signal to the external apparatus 120. Then, when the interface unit 111 receives connection authorization from the external apparatus 120, the interaction activity list generating apparatus 110 and the external apparatus 120 are connected. It is possible that the external apparatus 120 may not allow the interaction activity list generating apparatus 110 to be connected to the external apparatus 120. When the external apparatus 120 allows the interaction activity list generating apparatus 110 to be connected to the external apparatus 120, predetermined information about the interaction activity list generating apparatus 110 may be stored. The stored information may be used when the interaction activity list generating apparatus 110 is reconnected to the external apparatus 120.

According to another embodiment of the present invention, when the external apparatus 120 access an interaction activity list generating apparatus 110 within a predetermined range, the interface unit 111 connects the external apparatus 120 to the interaction activity list generating apparatus 110. According to the present embodiment, only when the external apparatus 120 physically contacts the interaction activity list generating apparatus 110, the external apparatus 120 may be connected to the interaction activity list generating apparatus 110. In this case, the external apparatus 120 does not have to be searched for and selected.

The displaying unit 113 displays the generated interaction activity list. In addition, when the connection between the external apparatus 120 and the interaction activity list generating apparatus 110 is released, and then the external apparatus 120 and the interaction activity list generating apparatus 110 are reconnected, the displaying unit 113 displays the interaction activity list related to the external apparatus 120 and the interaction activity list generating apparatus 110, which is stored in the storing unit 115. The displaying unit 113 may include a touch screen.

When a user selects a predetermined list in the interaction activity list displayed by the displaying unit 113, the controlling unit 114 determines a signal regarding a function that is selected in the displayed interaction activity list. Then, the controlling unit 114 transmits an instruction that the external apparatus 120 performs the selected function to the external apparatus 120 via the interface unit 111.

According to an embodiment of the present invention, after the interaction activity list generating apparatus 110 generates the interaction activity list, the interaction activity list generating apparatus 110 may transmit the metadata regarding the functions of apparatus including the interaction activity list generating apparatus 110, to the external apparatus 120. Here, the functions may be used in the external apparatus 120 interactively between the apparatuses including the interaction activity list generating apparatus 110 and the external apparatus 120. Alternatively, after the apparatuses are connected to each other, the apparatuses may exchange metadata regarding respective functions of the apparatuses and may generate respective interaction activity lists.

Figure 2:
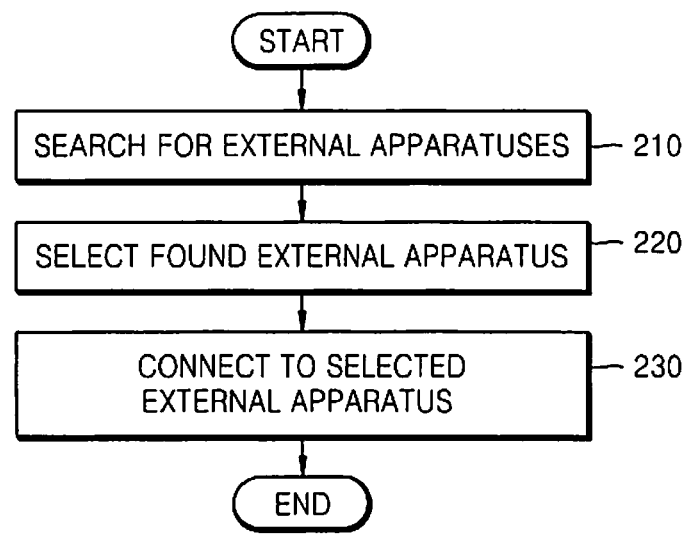
FIG. 2 is a flowchart of a method of connecting apparatuses, according to an embodiment of the present invention.

FIG. 2 is a flowchart of a method for connecting apparatuses, according to an embodiment of the present invention.

Referring to FIG. 2, in step 210, a connection requesting apparatus searches for external apparatuses that may be communicating with the connection requesting apparatus.

In step 220, the connection requesting apparatus selects one external apparatus from among found external apparatuses. The connection requesting apparatus transmits a connection request signal to the selected external apparatus.

In step 230, the connection requesting apparatus and the selected external apparatus are connected to each other. When the external apparatus receives the connection request signal, the external apparatus may transmit a signal for allowing connection with the connection requesting apparatus, in response to the connection request signal. It is possible that the external apparatus may not allow the connection with the connection requesting apparatus. When the external apparatus allows the connection with the connection requesting apparatus, predetermined information about the connection requesting apparatus may be stored. The stored information may be used when the connection requesting apparatus is reconnected to the external apparatus.

FIGS. 3A through 3D are diagrams explaining a method of connecting an external apparatus, according to an embodiment of the present invention.

In FIGS. 3A through 3D, a connection requesting apparatus is a mobile phone 310, and an apparatus that allows connection in response to a connection request is a digital television (TV) 320. The mobile phone 310 and the digital TV 320 include displays 311 and 321, respectively. The displays 311 and 321 may include a touch screen (not shown).

Figure 3:
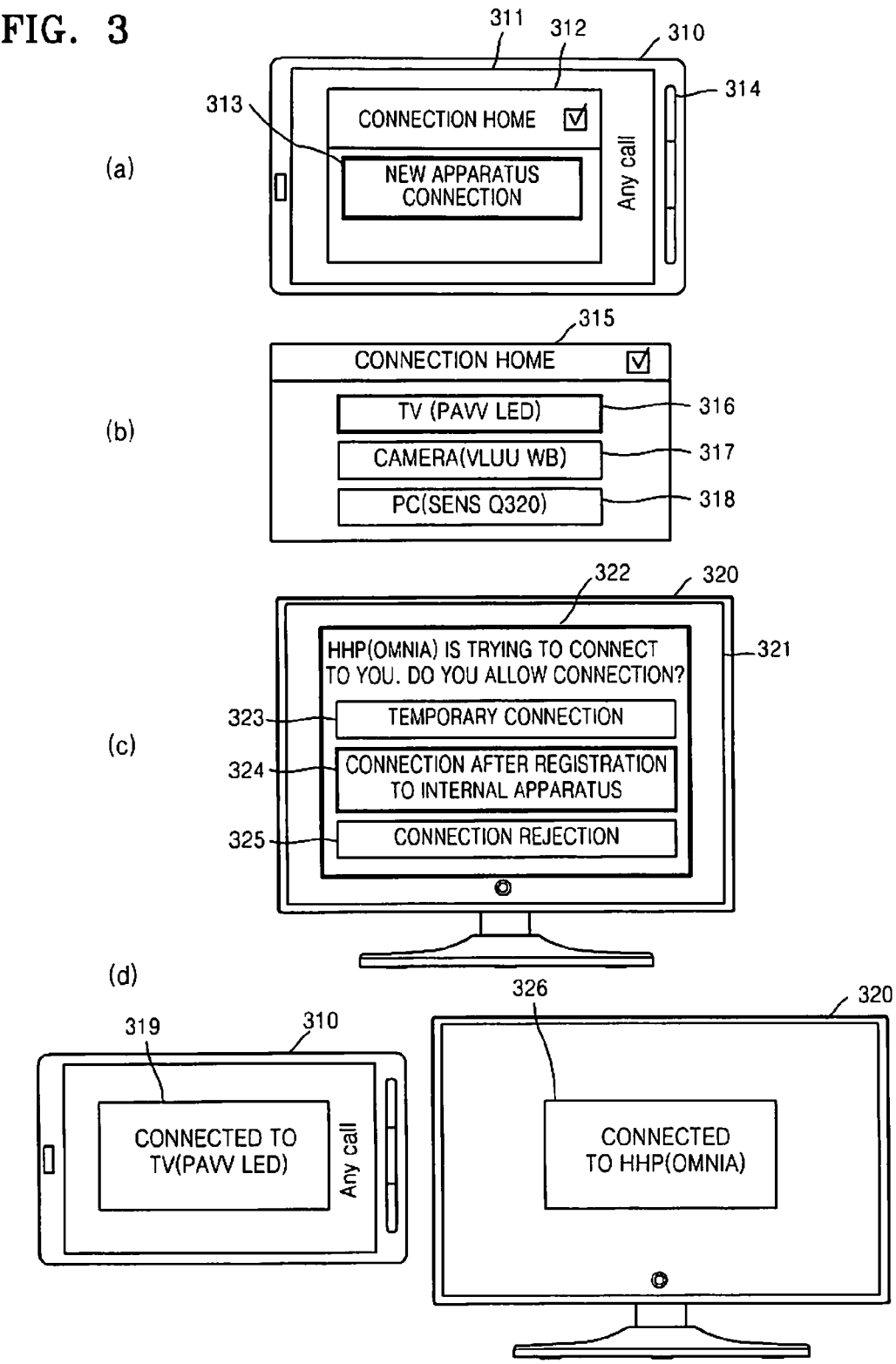
FIGS. 3A through 3D are diagrams explaining a method of connecting an external apparatus, according to an embodiment of the present invention.

Referring to FIG. 3A, when a user of the mobile phone 310 executes a search function of the mobile phone 310 in order to search for external apparatuses that may be connected to the mobile phone 310, a menu 312 for searching for the external apparatuses is displayed on the display 311 of the mobile phone 310. When the user selects an item 'NEW APPARATUS CONNECTION' 313 in the menu 312, the mobile phone 310 searches for external apparatuses that are located within a connectable distance. When the display 311 of the mobile phone 310 includes a touch screen, the user may select the item 'NEW APPARATUS CONNECTION' 313 by touching the item 'NEW APPARATUS CONNECTION' 313. In addition, the user may select the item 'NEW APPARATUS CONNECTION' 313 by using buttons 314.

In FIG. 3B, a menu 315 including items of found external apparatuses is displayed. The items of the found external apparatus include TV 316, CAMERA 317, PC 318, and the like. In order to display information regarding the external apparatus in more detail when the items are displayed, the items may further include peculiar information. For example, with regard to a TV, peculiar information indicating a product name may be further displayed. For example, in FIG. 3B, TV (PAVV LED) 316 is displayed. The user may select an external apparatus to be connected to the mobile phone 310 by touching an item of the external apparatus or using a button, and may request connection with the external apparatus.

FIG. 3C is a diagram related to the digital TV 320 that receives the connection request signal. When the TV 320 receives the connection request signal, a menu 322 regarding whether to allow connection is displayed. Items included in the menu 322 may include 'TEMPORARY CONNECTION' 323, 'CONNECTION AFTER REGISTRATION TO INTERNAL APPARATUS' 324, and 'CONNECTION REJECTION' 325. The 'TEMPORARY CONNECTION' 323 refers to an item for allowing the mobile phone 310 to be connected to the digital TV 320 just once. If connection between the mobile phone 310 and the digital TV 320 is released, the mobile phone 310 and the digital TV 320 may not be automatically re-connected to each other, but the connection between the mobile phone 310 and the digital TV 320 may be re-requested. The 'CONNECTION AFTER REGISTRATION TO INTERNAL APPARATUS' 324 refers to an item for storing predetermined information about the mobile phone 310 in a memory and then allowing the re-connection. If the connection between the mobile phone 310 and the digital TV 320 is released, when the mobile phone 310 tries to again be connected to the digital TV 320, and the same type of apparatus as the mobile phone 310 corresponding to the information stored in the memory, the apparatus may be automatically re-connected to the digital TV 320 regardless of whether to allow the connection or not. The 'CONNECTION REJECTION' 325 refers to an item for rejecting a connection request. When a user of the digital TV 320 selects items of the 'TEMPORARY CONNECTION' 323 or the 'CONNECTION AFTER REGISTRATION TO INTERNAL APPARATUS' 324, the mobile phone 310 and the digital TV 320 are connected. When the mobile phone 310 and the digital TV 320 are connected to each other, menus 319 and 326 for indicating the connection are displayed on the mobile phone 310 and the digital TV 320, respectively, as illustrated in FIG. 3D.

Figure 4:
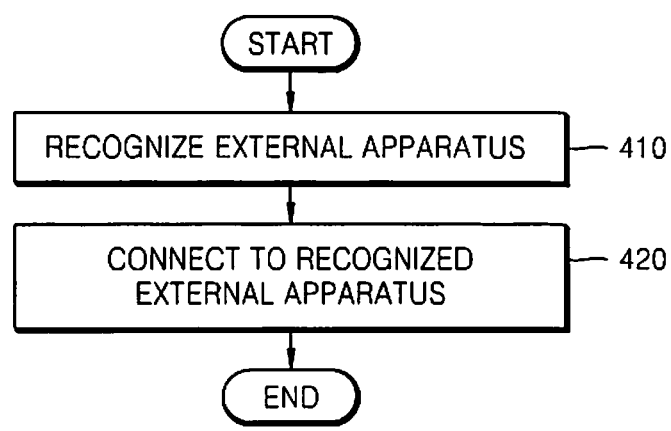
FIG. 4 is a flowchart of a method of connecting apparatuses, according to another embodiment of the present invention.

FIG. 4 is a flowchart of a method of connecting apparatuses, according to another embodiment of the present invention.

Referring to FIG. 4, in step 410, when an external apparatus is located within a predetermined range, the external apparatus is recognized. According to an embodiment of the present invention, the external apparatus may need to physically contact a connection allowance apparatus within a predetermined range. In FIG. 4, the external apparatus and the connection allowance apparatus may be automatically connected without searching for and selecting the external apparatus, unlike in FIG. 2.

In step 420, the connection allowance apparatus is connected to the recognized external apparatus.

Figure 5:
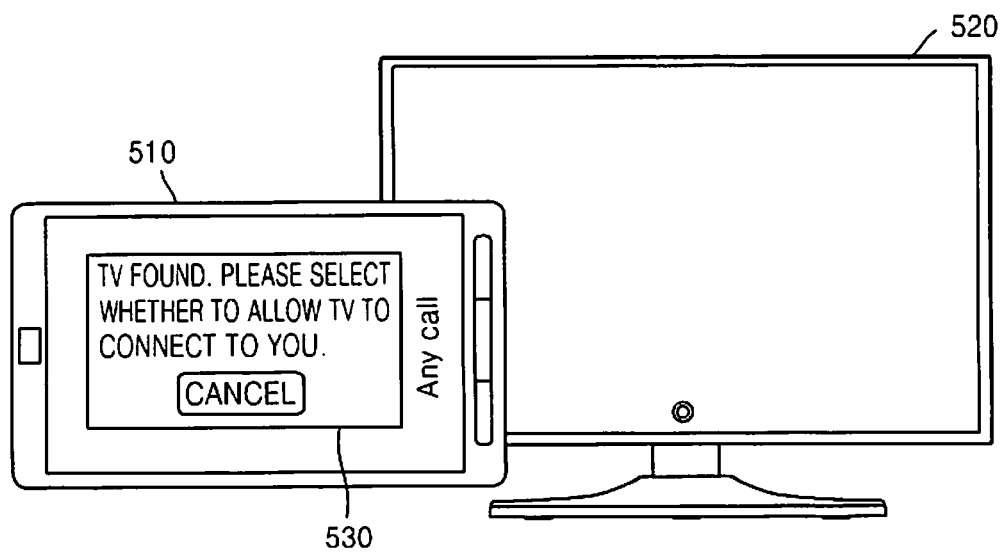
FIG. 5 is a diagram explaining a method of connecting apparatuses, according to another embodiment of the present invention.

FIG. 5 is a diagram explaining a method of connecting apparatuses, according to another embodiment of the present invention.

Referring to FIG. 5, a connection allowance apparatus is a digital TV 520, and a mobile phone 510 and the digital TV 520 may each include a display. The displays may include a touch screen. When the mobile phone 510 accesses the digital TV 520 within a predetermined range, the digital TV 520 recognizes the mobile phone 510. In this case, even if the mobile phone 510 may not request connection, a user of the digital TV 520 may determine whether to allow the digital TV 520 to be connected to the mobile phone 510. According to an embodiment of the present invention, the predetermined range is a distance between very adjacent locations. For example, when the mobile phone 510 includes radio-frequency identification (RFID), and the digital TV 520 includes a RFID reader, the predetermined range is a range that may be recognized by the RFID reader. Alternatively, the predetermined range may be set to correspond to a case where the mobile phone 510 physically contacts the digital TV 520. The steps to be performed after the digital TV 520 recognizes the mobile phone 510 are the same as in FIGS. 3C and 3D. According to another embodiment of the present invention, the mobile phone 510 may recognize the digital TV 520. In this case, after the mobile phone 510 requests the digital TV 520 to allow connection between the mobile phone 510 and the digital TV 520, the steps described with reference to FIGS. 3C and 3D may be performed. In this case, a menu 530 for requesting the connection may be displayed on the mobile phone 510.

In FIGS. 2 and 4, a first apparatus and a second apparatus may be connected in an Ad-hoc connection manner, or in an Infra connection manner. In the Ad-hoc connection manner, direct communication between the first apparatus and the second apparatus is performed without any access point. In the Infra connection manner that is one of wireless local area network (LAN) communication methods, communication between the first apparatus and the second apparatus is performed via an access point. According to an embodiment of the present invention, the Ad-hoc connection manner, or the Infra connection manner is automatically converted. However, the present embodiment is not limited to the Ad-hoc connection manner, or the Infra connection manner, and various connection methods may be used.

Figure 6:
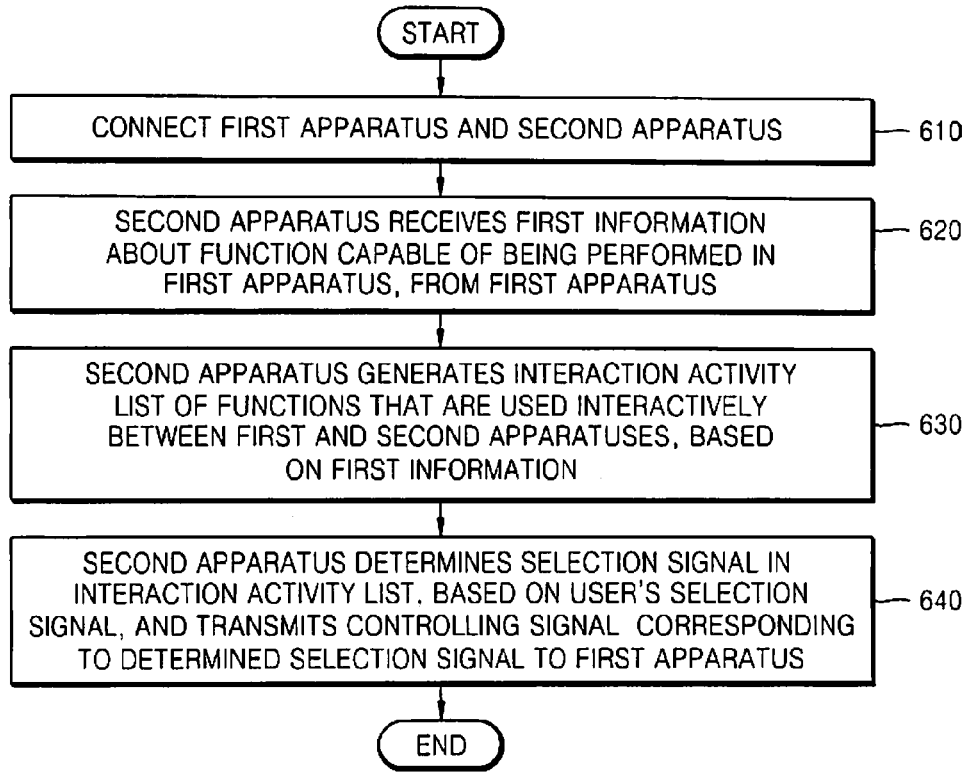
FIG. 6 is a flowchart of a method of generating an interaction activity list, according to an embodiment of the present invention.

FIG. 6 is a flowchart of a method of generating an interaction activity list, according to an embodiment of the present invention.

Referring to FIG. 6, in step 610, a first apparatus and a second apparatus are connected.

In step 620, the second apparatus receives information about a function to be performed by the first apparatus, from the first apparatus. The information about the function to be performed by the first apparatus includes metadata regarding the function of the first apparatus. The metadata includes the functions, performances and limitations of an apparatus, but is not limited thereto. The metadata may include any information as long as the information can be used to generate the interaction activity list. In addition, first information further includes controlling signals regarding functions and performances of the first apparatus. If the second apparatus receives the first information after requesting the first apparatus for the first information, the first information may further include authorization information with respect to the controlling signals of the first apparatus.

In step 630, the second apparatus generates the interaction activity list regarding functions that may be used interactively between the first apparatus and the second apparatus, based on the first information. In detail, the second apparatus selects functions of the second apparatus, which may be performed by the first apparatus, with reference to the functions, performances and limitations of the first apparatus. Then, the second apparatus generates the interaction activity list using the selected functions, and controlling signals corresponding to the selected functions from among the received controlling signals.

In step 640, the second apparatus determines a selection signal in the interaction activity list, based on a user's selection signal, and transmits a controlling signal corresponding to the determined selection signal to the first apparatus.

In the method of FIG. 6, the second apparatus receives metadata from the first apparatus, and generates the interaction activity list. According to an embodiment of the present invention, after the second apparatus generates the interaction activity list, the second apparatus may transmit metadata regarding functions of the second apparatus, which may be used in the first apparatus interactively between the first apparatus and the second apparatus, to the first apparatus. In addition, after the first apparatus and the second apparatus are connected, the first apparatus and the second apparatus may exchange metadata regarding respective functions of the first apparatus and the second apparatus, and may generate respective interactive activity lists.

Figure 7:
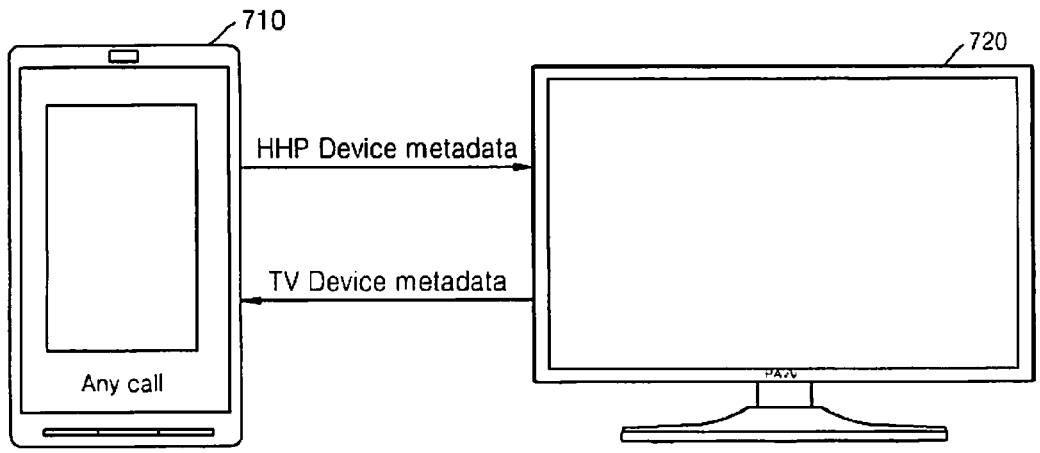
FIG. 7 is a diagram explaining a method of generating an interaction activity list, according to another embodiment of the present invention.

FIG. 7 is a diagram explaining a method of generating an interaction activity list, according to another embodiment of the present invention.

Referring to FIG. 7, a mobile phone 710 and a digital TV 720 are connected. The mobile phone 710 transmits metadata including information about functions, performances and limitations of the mobile phone 710 to the digital TV 720, and receives metadata including information about functions, performances and limitations of the digital TV 720 from the digital TV 720. The digital TV 720 transmits the metadata including information about functions, performances and limitations of the digital TV 720 to the mobile phone 710, and receives the metadata including information about functions, performances and limitations of the mobile phone 710 from the mobile phone 710. The mobile phone 710 and the digital TV 720 that interact with each other to generate respective interaction activity lists using the received metadata. The respective interaction activity lists generated by the mobile phone 710 and the digital TV 720 may be the same, or different. The mobile phone 710 and the digital TV 720 are synchronized with each other so as to share the generated interaction activity lists and to store the generated interaction activity lists in a predetermined memory.

FIGS. 8A and 8B are diagrams explaining interaction activity lists 813 and 821, according to an embodiment of the present invention. FIG. 8A shows an example of the interaction activity list 813 generated by a mobile phone 810, and FIG. 8B shows an example of the interaction activity list 821 generated by a digital TV 820.

Referring to FIG. 8A, the interaction activity list 813 is displayed on a display 811 of the mobile phone 810. The interaction activity list 813 includes items 815 through 819. The items 815 through 819 indicate functions of the mobile phone 810, which may also be performed by the digital TV 820. For example, when a user of the mobile phone 810 selects the item 'SHOW PICTURE ON TV' 815 by using buttons 812 or touching the display 811, the mobile phone 810 transmits pictures stored in the mobile phone 810, or pictures that are currently displayed on the display 811, to the digital TV 820. Then, the digital TV 820 displays the pictures received from the mobile phone 810 on a display of the digital TV 820. If there are many items, the items may be selected by moving a scroll bar 814 of the interaction activity list 813.

Referring to FIG. 8B, the interaction activity list 821 is displayed on the display of the digital TV 820. The interaction activity list 821 includes items 822 through 825. The items 822 through 825 indicate functions of the digital TV 820, which may also be performed by the mobile phone 810. For example, when a user of the digital TV 820 selects the item 'WATCH BROADCAST ON HHP' 822 by using a button, a remote controller, or a device for controlling the digital TV 820, the digital TV 820 transmits a broadcast program, which is received from an external source, to the mobile phone 810 by using a predetermined method. Then, the mobile phone 810 displays the broadcast program received from the digital TV 820 on the display 811 of the mobile phone 810.

Figure 9:
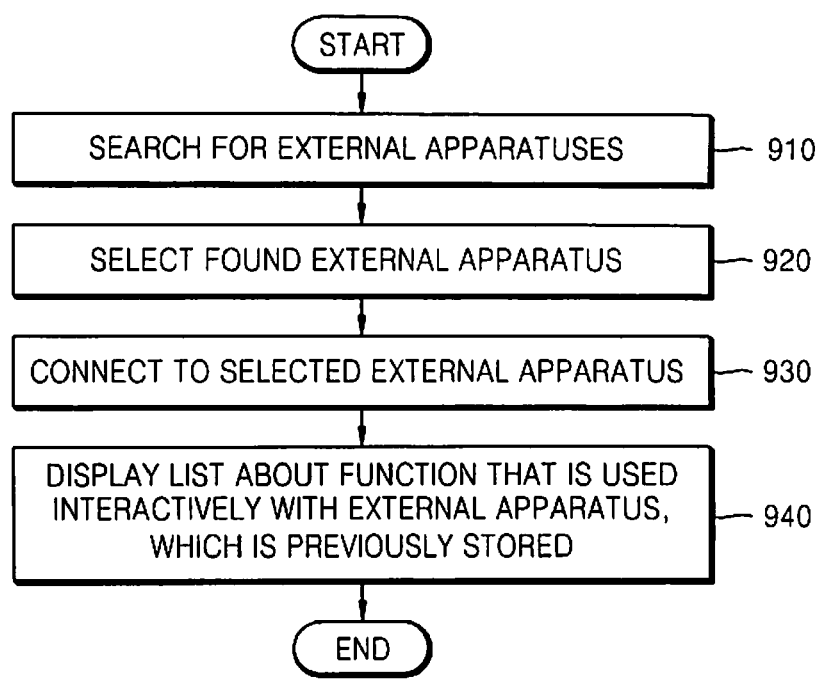
FIG. 9 is a flowchart of a method of using an interaction activity list, according to an embodiment of the present invention, and shows a case where the connection between the apparatuses of FIG. 2 or 4 is released, and then the apparatuses are reconnected.

FIG. 9 is a flowchart of a method of using an interaction activity list, according to an embodiment of the present invention. FIG. 9 shows a case where the connection between the apparatuses of FIG. 2 or 4 is released, and then the apparatuses are reconnected.

Referring to FIG. 9, in step 910, a connection requesting apparatus searches for external apparatuses. The connection requesting apparatus and the external apparatuses have been connected to each other, and then disconnected before. If information about the external apparatuses is stored in the connection requesting apparatus, the connection requesting apparatus may search for the external apparatuses. If information about the connection requesting apparatus is stored in the external apparatuses, when the connection requesting apparatus searches for the external apparatuses, the external apparatuses may transmit the information of the external apparatuses themselves to the connection requesting apparatus. FIG. 10A is a diagram explaining a list of found external apparatuses, which is displayed on the connection requesting apparatus, according to an embodiment of the present invention. For example, the connection requesting apparatus is a mobile phone 1010. A menu 1012 related to the list of found external apparatuses is displayed on a display 1011. The found external apparatuses may include a TV 1014, a CAMERA 1015, and a PC 1016. In addition, the connection requesting apparatus may further search for apparatuses that have not be connected to the connection requesting apparatus before by selecting an item 'CONNECT NEW DEVICE' 1013.

In step 920, an apparatus is selected from among the found external apparatuses. If the display 1011 of the mobile phone 1010 includes a touch screen, a user may select one external apparatus from among the found external apparatuses by touching an item corresponding to the external apparatus, or by using a button. When the user selects the item 'CONNECT NEW DEVICE' 1013, the method of FIG. 2 is performed.

According to another embodiment of the present invention, when an external apparatus is powered-off, the external apparatus may be searched for. In this case, when the connection requesting apparatus selects the external apparatus that is powered-off, the connection requesting apparatus transmits a wake-up signal to the external apparatus that is powered-off. Then, when the external apparatus is powered-on, the external apparatus is connected to the connection requesting apparatus. In FIG. 10A, when an item 'PC (SENS)' 1016 that is powered-off is selected, the wake-up signal is transmitted to the PC (SENS). Then, when the PC (SENS) is powered-on, the connection requesting apparatus is connected to the PC (SENS).

In step 930, the connection requesting apparatus is connected to the selected external apparatus. For example, in FIG. 10A, when a user selects the TV 1014 in the list of the found external apparatuses, the mobile phone 1010 is connected to a TV.

In step 940, after the connection requesting apparatus is connected to the external apparatus, an interaction activity list that is previously stored is displayed. When the connection requesting apparatus is reconnected to the external apparatus, an interaction activity list, which has been used when the connection requesting apparatus has been connected to the external apparatus before, is displayed without generating a new interaction activity list. If an interaction activity list is not stored, an interaction activity list may be generated by using the method of FIG. 6. When functions of an apparatus have been updated, the interaction activity list may be updated automatically or manually. Examples of the interaction activity list are shown in FIG. 8A or 8B. For example, when a user of the mobile phone 1010 selects the item 'SHOW PICTURE ON TV' 815 by using a button or touching a display, the mobile phone 1010 transmits pictures stored in the mobile phone 1010, or pictures that are currently displayed on the display, to the selected TV. Then, the TV displays the pictures received from the mobile phone 1010 on a display of the TV.

FIG. 10B is a diagram explaining a list of found external apparatuses, which is displayed on the connection requesting apparatus, according to another embodiment of the present invention. For example, when a digital TV 1020 includes a large-sized display, a window 1023 for a list of items 1025 through 1027 of the found apparatuses, and a window 1024 for items 1028 through 1030 of an interaction activity list may be displayed.

Figure 11:
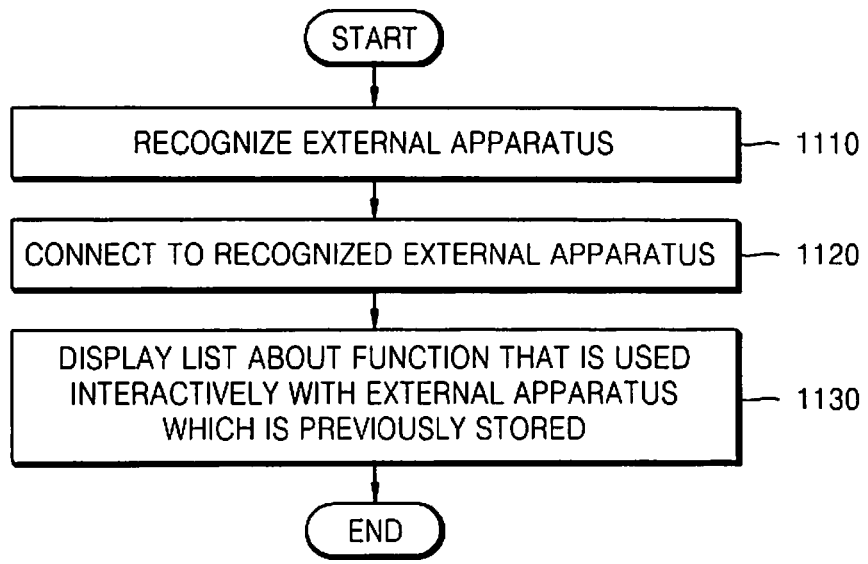
FIG. 11 is a flowchart of a method of using an interaction activity list, according to another embodiment of the present invention.

FIG. 11 is a flowchart of a method of using an interaction activity list, according to another embodiment of the present invention. FIG. 11 shows a case where the connection between the apparatuses of FIG. 2 or 4 is released, and then the apparatuses are reconnected.

Referring to FIG. 11, in step 1110, when an external apparatus is located within a predetermined range, the external apparatus is recognized. According to an embodiment of the present invention, the external apparatus may need to physically contact a connection allowance apparatus within a predetermined range. In FIG. 11, the external apparatus and the connection allowance apparatus may be automatically connected without searching for and selecting the external apparatus, unlike in FIG. 9.

In step 1120, the connection allowance apparatus is connected to the recognized external apparatus.

In step 1130, after the connection allowance apparatus is connected to the external apparatus, an interaction activity list that is previously stored is displayed. When the connection allowance apparatus is reconnected to the external apparatus, an interaction activity list, which has been used when the connection allowance apparatus has been connected to the external apparatus before, is displayed without generating a new interaction activity list.

Figure 12:
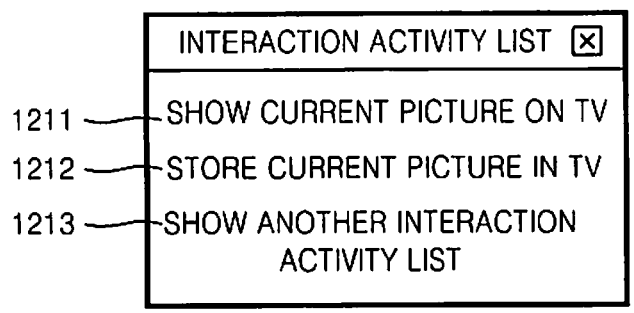
FIG. 12 is a diagram explaining an interaction activity list that is used in the method of FIG. 11, according to an embodiment of the present invention.

FIG. 12 is a diagram explaining an interaction activity list that is used in the method of FIG. 11, according to an embodiment of the present invention. For example, when a picture is currently displayed on a mobile phone, an interaction activity list related to pictures is displayed. When an item 'SHOW CURRENT PICTURE ON TV' 1211, is selected, a function of displaying the current picture on an external apparatus, that is, a TV is performed. In addition, when an item 'SHOW ANOTHER INTERACTION ACTIVITY LIST' 1213 is selected, an interaction activity list for performing other functions is displayed.

FIGS. 13 through 17 are diagrams of apparatuses for generating or using interaction activity information, according to embodiments of the present invention.

Figure 13:
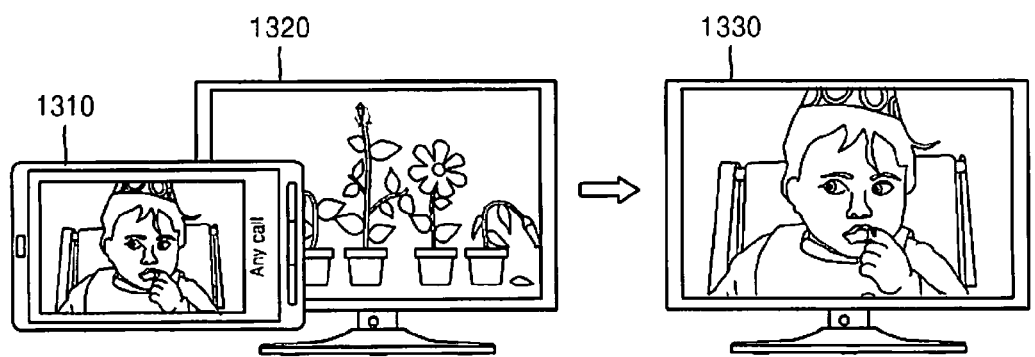
FIGS. 13 through 17 are diagrams of apparatuses for generating or using interaction activity information, according to embodiments of the present invention.

Referring to FIG. 13, a first apparatus is a mobile phone 1310, and a second apparatus is a TV 1320. Currently, the mobile phone 1310 displays a picture, and the TV 1320 displays a broadcast program. In this case, when the mobile phone 1310 and the TV 1320 contact each other, the current contents of the mobile phone 1310 are directly executed in the TV 1320. In FIG. 13, the picture displayed on the mobile phone 1310 is directly displayed on the TV 1320. The first apparatus may be a mobile apparatus that is capable of performing media-playback, and the second apparatus may be an image reproducing apparatus.

Figure 14:
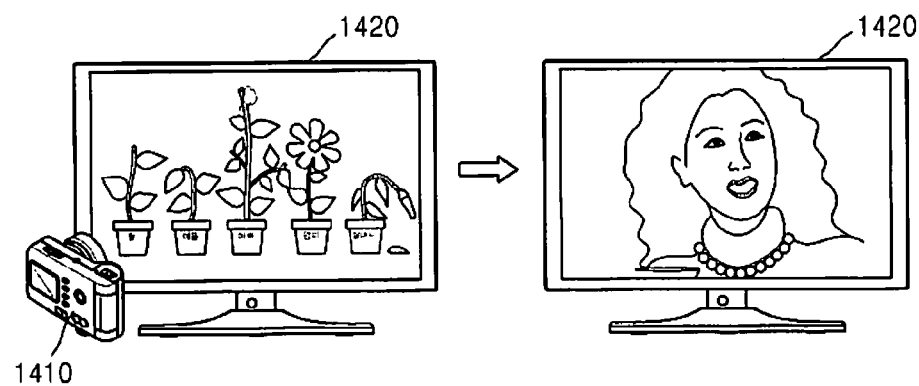

Referring to FIG. 14, the first apparatus is a camcorder 1410, and the second apparatus is a TV 1420. The camcorder 1410 is on standby to perform photographing, and the TV 1420 displays a broadcasting program. In this case, when the camcorder 1410 and the TV 1420 contact each other, pictures taken by the camcorder 1410 are streamed to the TV 1420 in real-time. Of course, recording, or the like may be performed. The first apparatus may be an apparatus that is capable of performing photographing, and the second apparatus 1420 may be an image reproducing apparatus.

Figure 15:
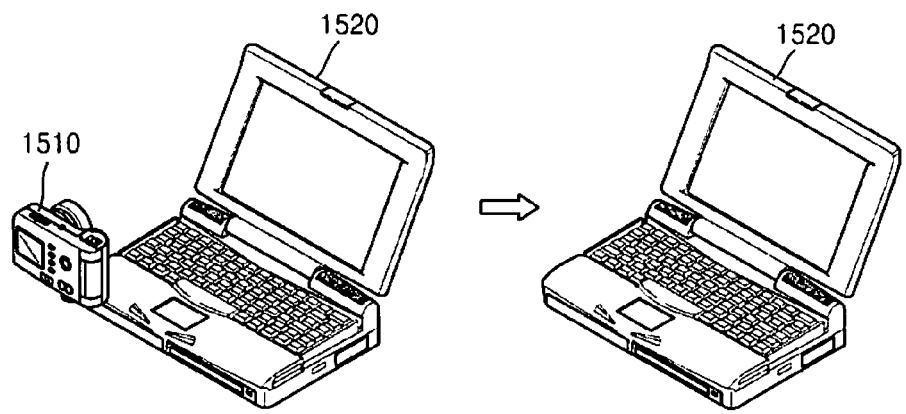

Referring to FIG. 15, the first apparatus is a digital camera 1510, and the second apparatus is a personal computer 1520. The digital camera 1510 is powered-on, and the personal computer 1520 is powered-on. In this case, when the digital camera 1510 and the personal computer 1520 contact each other, contents of the digital camera 1510 is backed up to a folder that is previously stored in the personal computer 1520. The contents may include any contents that need to be backed up, such as pictures, moving pictures, memos, and schedules. The first apparatus may be any apparatus that require a backup, and the second apparatus may be a computer.

Figure 16:
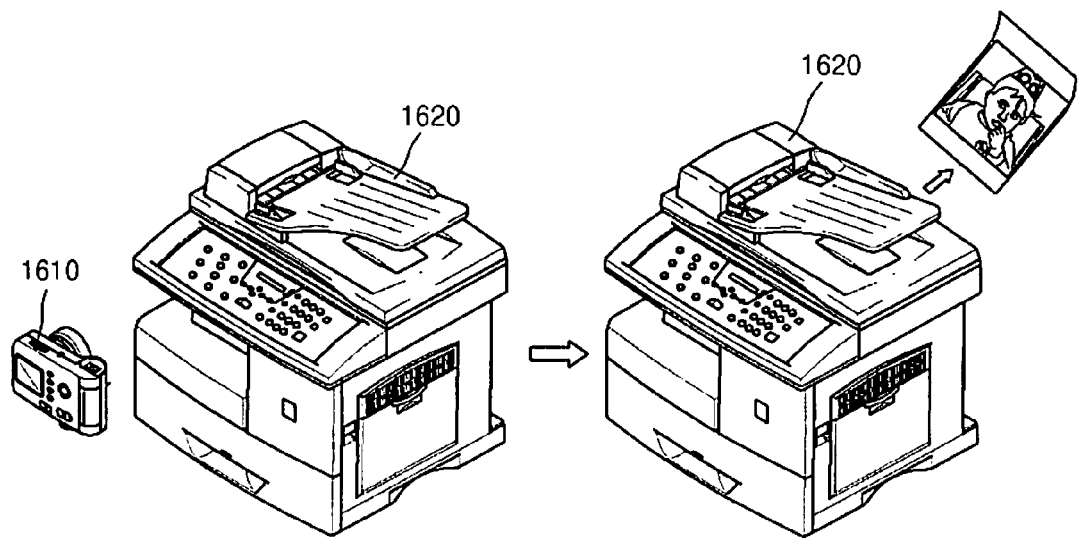

Referring to FIG. 16, the first apparatus is a digital camera 1610, and the second apparatus is a printer 1620. The digital camera 1610 displays a picture, and the printer 1620 is powered-on. In this case, when the digital camera 1610 and the printer 1620 contact each other, contents, that is, pictures of the digital camera 1610 are printed out by the printer 1620. The contents may include any contents that are capable of being printed out. The first apparatus may be an apparatus that is capable of performing media-playback, and the second apparatus may be a printer.

Figure 17:
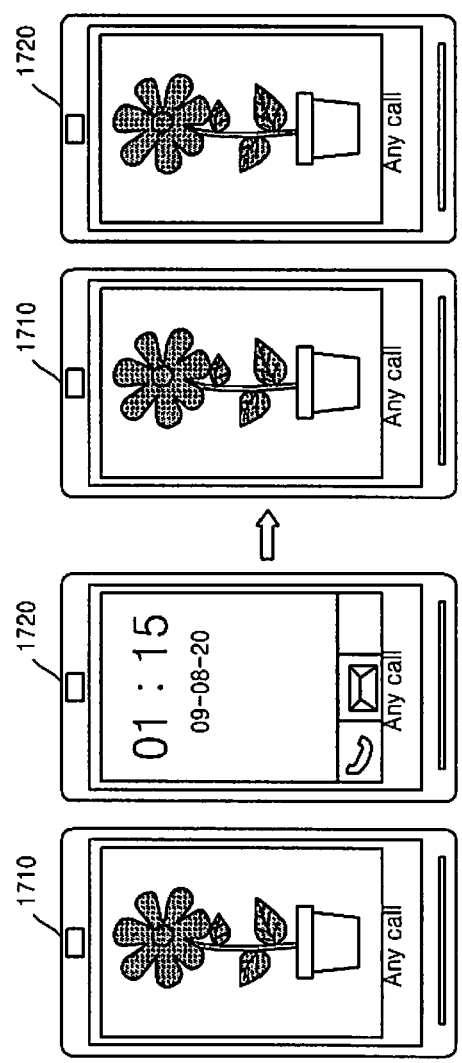

Referring to FIG. 17, the first apparatus is a first mobile phone 1710, and the second apparatus is a second mobile phone 1720. The first mobile phone 1710 displays a picture, and the second apparatus is on standby. In this case, when the first mobile phone 1710 and the second mobile phone 1720 contact each other, contents, that is, a picture of the first mobile phone 1710 may be transmitted to the second mobile phone that is on standby. The first apparatus may be an apparatus that is capable of performing media-playback, and the second apparatus may be an apparatus that is on standby.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of sending information, performed by a device, the method comprising:
    establishing communication with at least one external device;
    obtaining first information about the external device;
    displaying at least one function of the device which is executed in the external device;
    generating second information, based on the first information, about at least one function of the external device; and
    sending control information, to the external device, indicating a function among the at least one function of the device to be executed by the external device,
    wherein the indicated function is executed in the external device and controlled by the device.

2. A method of displaying a function list, performed by a device, the method comprising:
    establishing communication with at least one external device;
    obtaining information about the external device;
    displaying at least one function of the device which is executed in the external device; and
    displaying a list, based on the information, of at least one function of the external device,
    wherein the at least one function of the external device is executed in the external device and controlled by the device.

3. The method of claim 2, further comprising:
    receiving an input for selecting one of the at least one function in the device.

4. The method of claim 3, further comprising:
    transmitting a media content related to the selected function to the external device.

5. A method, performed by a device, of executing a function with an external device, the method comprising:
    establishing communication with the external device;
    transmitting information about the device;
    receiving control information, from the external device, indicating the function to be executed by the device;
    displaying at least one function of the device which is executed in the external device; and
    based on the control information, executing the function in the device and controlling execution of the function in the device using the external device.

6. The method of claim 5, further comprising:
    receiving a media content related to the function from the external device; and
    displaying the media content on the device.

* * * * *